United States Patent [19]

Sink et al.

[11] 4,285,424
[45] Aug. 25, 1981

[54] LOCKING DEVICE FOR A FRICTION TYPE CLUTCH

[75] Inventors: William H. Sink, Auburn; Richard A. Flotow, Fort Wayne, both of Ind.

[73] Assignee: Dana Corporation, Toledo, Ohio

[21] Appl. No.: 119,921

[22] Filed: Feb. 8, 1980

Related U.S. Application Data

[63] Continuation of Ser. No. 896,290, Apr. 14, 1978, abandoned.

[51] Int. Cl.³ .............................................. F16D 13/75
[52] U.S. Cl. .................................................. 192/111 B
[58] Field of Search ............. 192/111 B, 70.25, 70.26; 74/530, 573; 151/28

[56] References Cited

U.S. PATENT DOCUMENTS

| | | | |
|---|---|---|---|
| 578,598 | 3/1897 | Davis | 74/573 X |
| 1,440,911 | 1/1923 | Daly et al. | 74/530 X |
| 1,571,015 | 1/1926 | Leighton | 192/70.25 |
| 2,057,802 | 10/1936 | Tatter | 192/111 A |
| 2,207,051 | 7/1940 | Colman | 192/111 A |
| 2,280,355 | 4/1942 | Spase et al. | 192/111 A |
| 2,395,308 | 2/1946 | Wemp | 74/573 X |
| 2,758,691 | 8/1956 | Palm | 192/111 B |
| 3,176,814 | 4/1965 | Sink | 192/111 B |
| 3,752,286 | 8/1973 | Sink | 192/111 A |
| 3,754,628 | 8/1973 | Hildebrand | 192/111 B |
| 3,833,194 | 9/1974 | Salter | 248/571 |
| 4,086,995 | 5/1978 | Spokas | 192/111 B |

*Primary Examiner*—Rodney H. Bonck
*Attorney, Agent, or Firm*—Wilson, Fraser, Barker & Clemens

[57] ABSTRACT

An adjusting device for a spring loaded friction type clutch is incorporated, as a sub-assembly, in the lever system of the clutch between an actuating collar and an axially movable adjusting ring so as to be operable to permit the manual advance of the adjusting ring as the friction surfaces of the clutch wear, lock the adjusting ring to compensate for the clutch wear. The improvement being a locking device having support means secured to the clutch cover and means to engage radially extending teeth of the adjusting ring to suitably lock the same against rotation after adjustment thereof to compensate for clutch wear.

1 Claim, 14 Drawing Figures

LOCKING DEVICE FOR A FRICTION TYPE CLUTCH

This is a continuation, of application Ser. No. 896,290 filed Apr. 14, 1978, now abandoned.

BACKGROUND OF THE INVENTION

1. Field of the Invention

The present invention relates to spring loaded friction clutches in general and more particularly to locking devices for locking the adjusting ring after being adjusted to compensate for wear in the friction surfaces of such clutches.

2. Description of the Prior Art

Automatic adjusting devices interposed in the lever system of a friction clutch so as to be operable to compensate wear of the friction surfaces are well known. Such devices are disclosed in U.S. Pat. Nos. 2,207,051, 2,280,355, and 3,752,286. While these particular arrangements operate in a satisfactory manner to compensate for wear, it can be seen that numerous parts are required to accomplish the desired result. Further, the operating parts are disposed outside the cover thereby subjecting them to possible damage. While the U.S. Pat. No. 2,057,802, has remedied this problem somewhat by providing an automatic adjusting device positioned within the cover member. Here again, the arrangement required an expressive mechanism.

Oftentimes, spring loaded friction clutches provided with such automatic clutch adjusting devices are rebuilt and equipped with manual devices for locking the adjusting ring to effectively reduce the rebuilding cost by utilizing less expensive manual adjusting and locking means.

SUMMARY OF THE INVENTION

The present invention comprises a locking device in the lever system of a friction disk clutch assembly which will operatively connect a threaded adjusting ring and an axially shiftable actuating collar such that wear occurring in the friction surfaces of the clutch may be manually adjusted during rebuilding or repair of the clutch and maintained thereby. The locking device includes a mounting bracket secured to the clutch cover and has means engagable with the radially extending teeth of the adjusting ring to suitably lock the same against rotation after adjustment thereof to compensate for clutch wear.

It is an object of the invention to produce a simple device attached to the clutch cover for locking the adjuster ring after the necessary wear adjustment has been accomplished in a spring loaded friction type clutch.

Another object of the invention is to produce a locking device in the form of a sub-assembly which is readily and easily installed on existing spring loaded friction type clutches enabling easy initial adjustment of the clutch and also ready access for adjustment procedures.

Still another object of the invention is to produce a locking device for the adjuster ring of a spring loaded friction type clutch which may be easily and economically manufactured.

BRIEF DESCRIPTION OF THE DRAWINGS

The above, as well as other object and advantages of the invention will become readily apparent to one skilled in the art from reading the following detailed description of the invention when considered in the light of the accompanying drawings, in which.

DESCRIPTION OF THE PREFERRED EMBODIMENT

Figure 2:
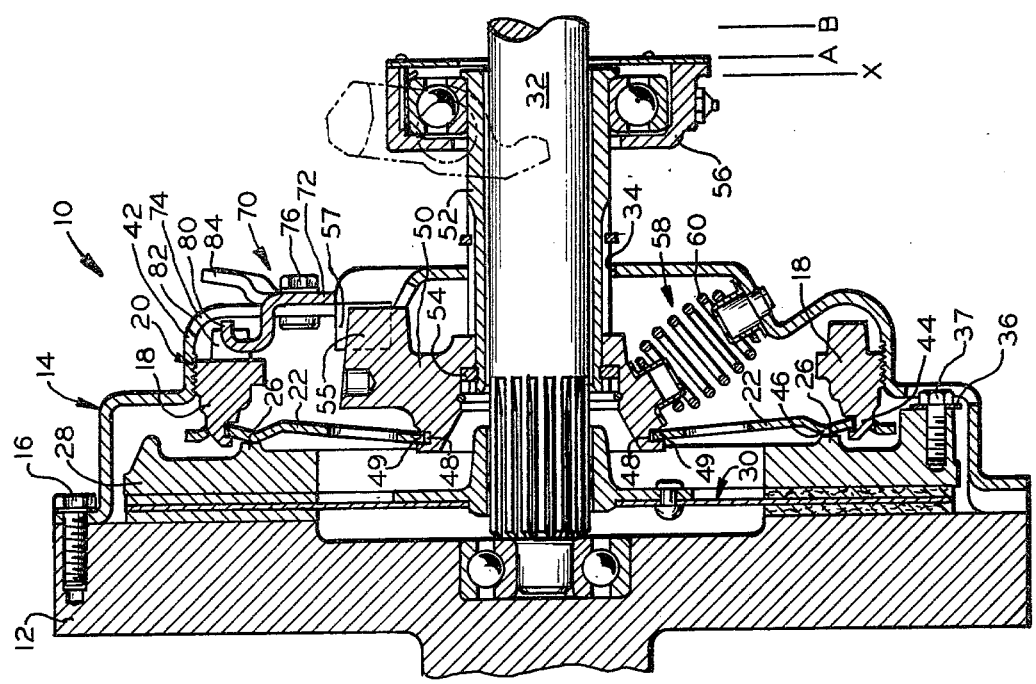
FIG. 2 is a sectional view of the clutch assembly illustrated in FIG. 1 taken along line 2—2 thereof.
Figure 1:
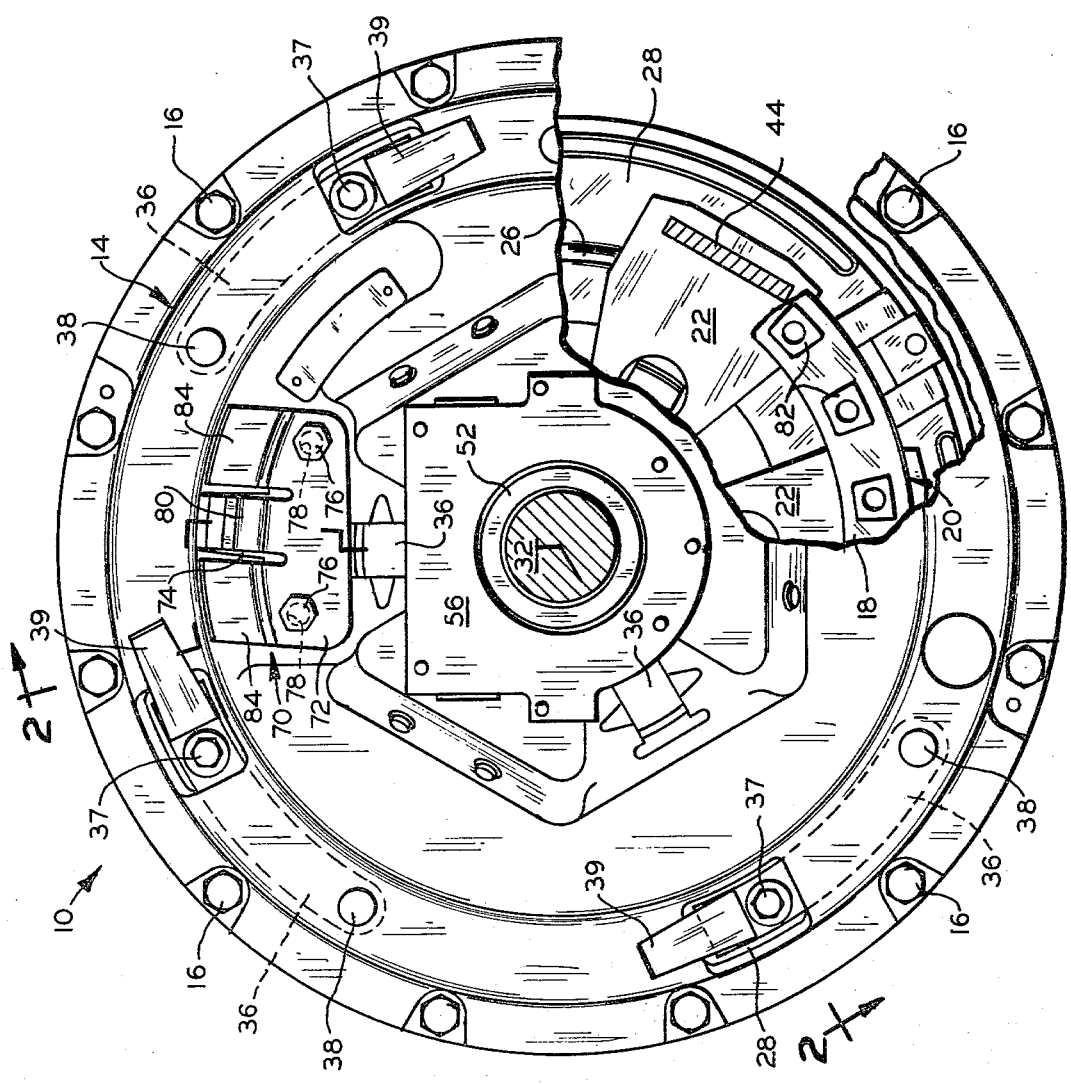
FIG. 1 is an end elevational view partially cut away of a clutch assembly embodying this invention.

Referring now to FIGS. 1 and 2 of the drawings, there is shown generally at 10, a spring loaded friction clutch of the pull-type which is drivingly connected for unitary rotation to a drive member in the form of a flywheel 12. More particularly, the clutch 10 comprises a cover 14 secured to the flywheel 12 at its outer periphery, by means of a plurality of bolts 16 so as to be driven thereby, an adjusting ring 18 peripherally connected to the interior of the cover 14 by a threaded engagement, shown generally at 20, so that circumferential rotative movement of the adjusting ring relative to the cover results in simultaneous axial movement of the adjusting ring 18 relative to the cover 14 and other portions of the clutch 10. A plurality of radially extending clutch operating levers 22 are pivotally connected to the back face of the adjusting ring 18 and engage an annular shoulder 26 formed on a pressure plate 28 for urging the pressure plate forwardly to press a driven member 30 into frictional driving engagement with the flywheel 12.

An output shaft, shown fragmentarily at 32, is adapted to be clutched into driving relationship with the flywheel 12 through the driven member 30, and is piloted at its forward end in the flywheel and extends axially rearwardly therefrom through an opening 34 in the center portion of the cover 14. The driven member 30 is splined for unitary rotation and relative axial movement on the forward end of the output shaft 32 so that it can be pressed into driving relationship with the flywheel 12 by means of the axially movable pressure plate 28. The pressure plate 28 is also drivingly connected to the cover 14 by means of a plurality of drive straps 36 having one end connected to the pressure plate 28 by a threaded fastener 37 and the other end connected to the cover 14 by pivot means 38. Extending outwardly of the end of the strap 36 containing the threaded fastener 37 is a return spring extension 39.

The adjusting ring 18 is annular in configuration and adapted to be adjustable axially to take-up for wear of the friction surfaces of the clutch. For this purpose, the adjusting ring 18 is peripherally connected to an axial flange portion 42 on the cover 14 by the threaded engagement 20 so that circumferential movement of the adjusting ring 18 rotates the same relative to the cover 14 resulting in axial movement of the adjusting ring relative to the cover and also to the other portions of the clutch. A plurality of longitudinally extending spaced apart ribs 44 are provided on the inside face of the adjusting ring 18 for pivotally supporting the outer ends of the release levers 22. Radially inward from this pivotal connection, the levers 22 are provided with a detent portion 46 against the shoulder 26 urging the pressure plate 28 forwardly, to the left in FIG. 2, to press the driven member 30 into frictional engagement with the flywheel 12.

Means are provided to pull the inner ends of the clutch levers 22 axially to the right, as viewed in FIG. 2, to disengage the clutch. To this end, the radial inner ends 49 of the levers 22 are disposed in a peripheral groove 48 at the inner end of an actuating collar 50 which collar is splined to and secured against axial movement relative to the left end of a hollow release sleeve 52 by an annular snap ring 54. The sleeve 52 is concentrically disposed about the output shaft 32 and spaced a sufficient distance outwardly thereof so as to be freely rotatable and axially movable relative thereto. The sleeve 52 is axially elongated and passes through the central opening 34 in the cover 14 and has secured to the right end thereof a throw-out bearing 56 with the throw-out bearing operatively connected by suitably linkage to a foot pedal for inducing axial movement to the sleeve 52 and accordingly the actuating collar 50 for controlling operation of the clutch between its engaged and disengaged position. The actuating collar 50 is drivingly connected to the cover 14 through drive lug means 55 of the collar 50 which cooperate with inwardly extending ear members 57 integral with the cover 14.

Means is shown generally at 58 for normally urging the inner ends of the levers 22 and thereby the pressure plate 28 axially to compress the driven member 30 against the flywheel 12 and is constructed in accordance with the teachings of the U.S. Pat. No. 3,394,788. This means includes a plurality of pairs of circumferentially spaced coiled compression engaging springs 60 which are disposed angularly so as to be compressed between the cover 14 and the actuating collar 50 and react to urge the collar and hence the inner ends 49 of the clutch levers 22 to the left, in FIG. 2, thereby biasing the pressure plate 28 toward the flywheel 12 to compress the driven member 30 therebetween. Pivoting movement of the clutch levers 22 by the actuating collar 50 results in pulling of the inner ends 49 of the levers 22 to the right allowing the pressure plate 28 to be moved away from the flywheel 12 by the plurality of spaced return spring extensions 39; and by this arrangement serves to withdraw the pressure plate 28 from the driven member 30 as the biasing force of the engaging springs 60 is overcome.

For the purpose of compensating for wear in the friction surfaces of the clutch, means is provided for shifting the adjusting ring 18 axially inwardly, to the left as viewed in FIG. 2, so that as the wear occurs, the pivot point about which the levers 22 pivot, moves gradually toward the flywheel 12.

Normally, the throw-out bearing 56 starts from position A and moves to the right to position B to effect the throwing-out operation of the clutch and then back to the starting position A, which is considered to be the normally engaged position of the clutch. As the friction surfaces of the clutch gradually wear, the throw-out bearing 56, release sleeve 52, and actuating collar 50, which are interconnected for simultaneous movement, move further and further to the left of the starting position A toward position X. When sufficient wear of the friction surfaces has occurred to require an adjustment, the throw-out mechanism 56, release sleeve 52, and actuating collar 50 as a unit, will have moved or returned a sufficient distance beyond or to the left of the starting position to require the clutch assembly to be adjusted to take-up for wear or to be rebuilt.

Figure 3:
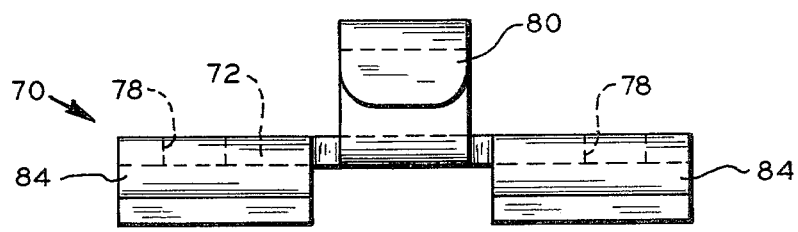
FIG. 3 is an enlarged plan view of the locking device illustrated in FIGS. 1 and 2 embodying the features of the invention.
Figure 4:
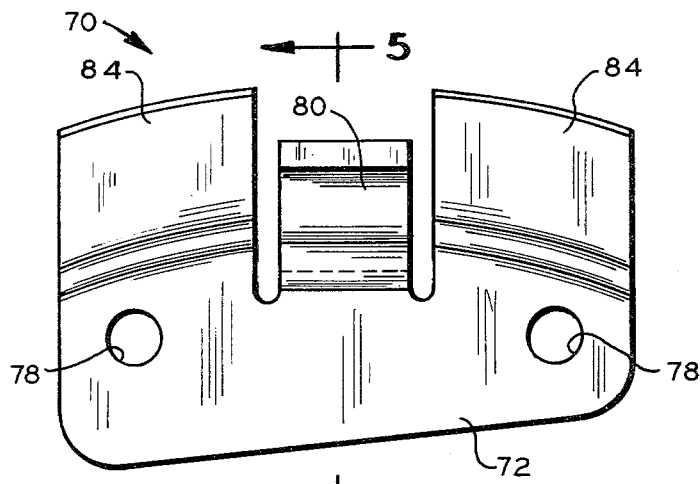
FIG. 4 is a front elevational view of the locking device illustrated in FIG. 3.
Figure 5:
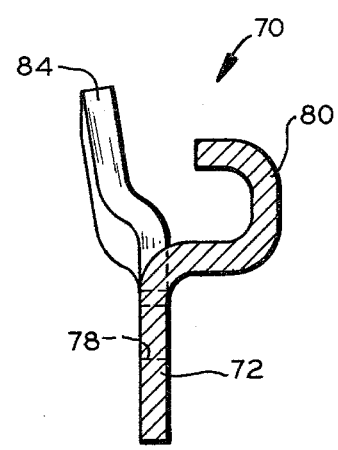
FIG. 5 is an end elevational view of the locking device illustrated in FIGS. 3 and 4.

Referring now additionally to FIGS. 3, 4, and 5, there is provided a locking device 70 consisting of a sub-assembly adapted to be incorporated in the clutch 10 between the adjusting ring 18 and the actuating collar 50. The locking device 70 is typically formed of sheet metal stamped to the desired shape which includes an elongate mounting bracket 72 adapted to span an opening 74 in the back wall portion of the cover 14. Also, the opening 74 is situated in such a manner as to expose a zone between the central opening portion of the adjusting ring 18 and the drive lugs 36 integral with the actuating collar 50. As clearly illustrated in FIG. 1, the mounting bracket portion 72 is secured at opposite ends thereof to the back face of the cover 14 by bolts 76 passing through spaced apart openings 78, which threadably engage suitable means provided in the back face of the cover 14. A detent portion 80 is struck from an intermediate portion of the blank employed in forming the locking device 70 and extends inwardly and upwardly from the bracket portion 72. The detent portion 80 is adapted to extend inwardly of the cover 14 toward the flywheel 12 and into a space between spaced apart lugs 82 which extend outwardly of the adjusting ring 18 to thereby militate against any circumferential rotative movement of the adjusting ring 18.

On opposite sides of the detent portion 80, there are upwardly and slightly outwardly extending arm portions 84 which function to provide additional weight to the locking device 70 to assist in balancing the clutch assembly during operation thereof. It must be remembered that in the event the illustrated clutch assembly were being rebuilt and the locking device 70 employed to replace a self-adjusting device of the type illustrated and described in U.S. Pat. No. 3,752,286, the weight of the substituted assembly must be substantially equal to the original assembly to assure proper balancing characteristics.

Further, it will be understood that initial adjustment of the adjusting ring is made by inserting a suitable cool through the aperture 71 to effect manual adjustment, but is only after this manual adjustment of the adjusting ring 18 is made that the locking device 70 is positioned and affixed to the cover 14.

FIGS. 6 through 14 show other modified embodiments of locking devices similar to the aforementioned locking device 70. To facilitate the description and understanding of the structures, prime reference numerals will be used when referring to similar structural features.

Figure 6:
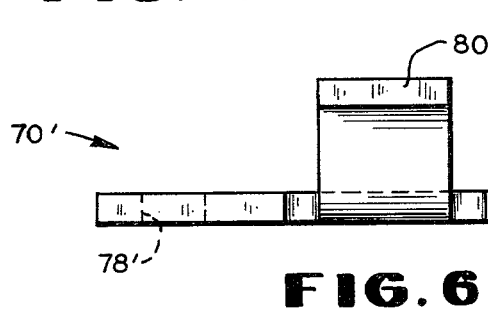
FIG. 6 is an enlarged plan view of a modified form of the locking device illustrated in FIGS. 3, 4, and 5.
Figure 7:
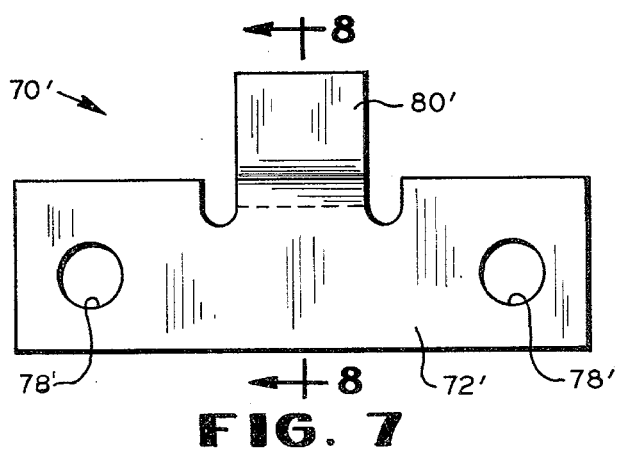
FIG. 7 is a front elevational view of the locking device illustrated in FIG. 6.
Figure 8:
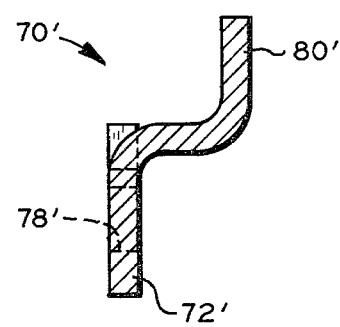
FIG. 8 is an end elevational view of the locking device illustrated in FIGS. 6 and 7.

With reference to FIGS. 6, 7, and 8, there is illustrated a locking device 70' formed of sheet metal which includes an elongate mounting bracket portion 72' adapted to span the opening 74 in the back wall portion of the cover 14. The mounting bracket portion 72' has a pair of spaced apart openings 78' which are adapted to receive threaded fasteners for securing the locking device to the associated cover 14. A detent portion 80' is struck from an intermediate portion of the blank employed in forming the locking device 70' and extends inwardly and upwardly from the bracket portion 72'. The detent portion 80' is provided to butt against suitably formed lug members 82 which typically extend outwardly from the adjusting ring 18 of an associated clutch. When the aforementioned locking device 70" is used as a replacement for an automatic locking device, for example, consideration must be given to the weight thereof to assure that the balance of the clutch is not adversely affected.

Figure 9:
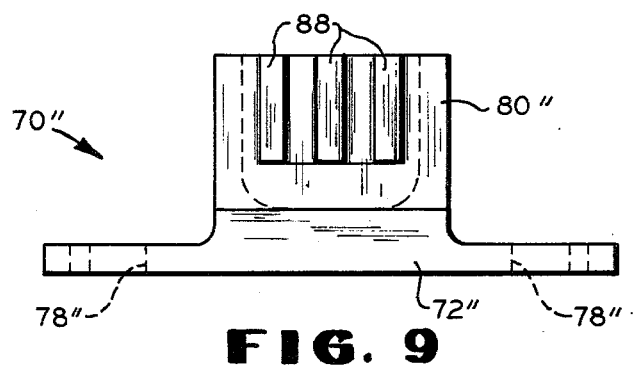
FIG. 9 is an enlarged plan view of still another modified form of the locking device illustrated in FIGS. 3, 4, and 5.
Figure 10:
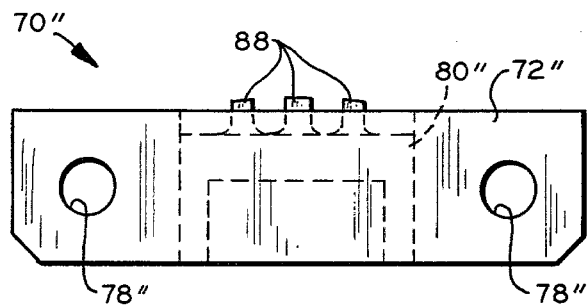
FIG. 10 is a front elevational view of the locking device illustrated in FIG. 9.
Figure 11:
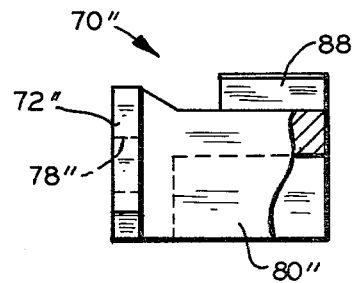
FIG. 11 is an end elevational view of the locking device illustrated in FIGS. 9 and 10.

In FIGS. 9, 10, and 11, there is illustrated a locking device 70" similar in structure and function to the locking devices 70 and 70' explained hereinbefore. The locking device 70' is typically designed to be preferably formed of cast or sintered metal and includes an elongate mounting bracket portion 72" adapted to span the opening 74 in the back wall portion of the cover 14. The mounting bracket portion 72" has a pair of spaced apart openings 78" which are adapted to receive threaded fasteners for securing the locking device to the associated cover 14. A detent portion 80" is formed to extend inwardly of the mounting bracket portion 72" and has a plurality of upwardly extending teeth-like members 88 which are adapted to extend inwardly and suitably mesh with circumferential teeth of an adjusting ring 18 of the type illustrated and described in U.S. Pat. No. 3,752,286, to lock the same against any relative rotating movement. As in the previously mentioned locking devices, the weight of the locking device 70" must be taken into consideration in achieving balance of the entire clutch assembly with which the locking device is used.

Figure 12:
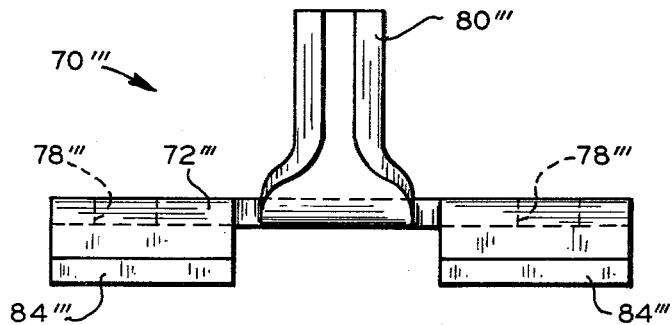
FIG. 12 is an enlarged plan view of another modified form of the locking device illustrated in FIGS. 3, 4, and 5.
Figure 13:
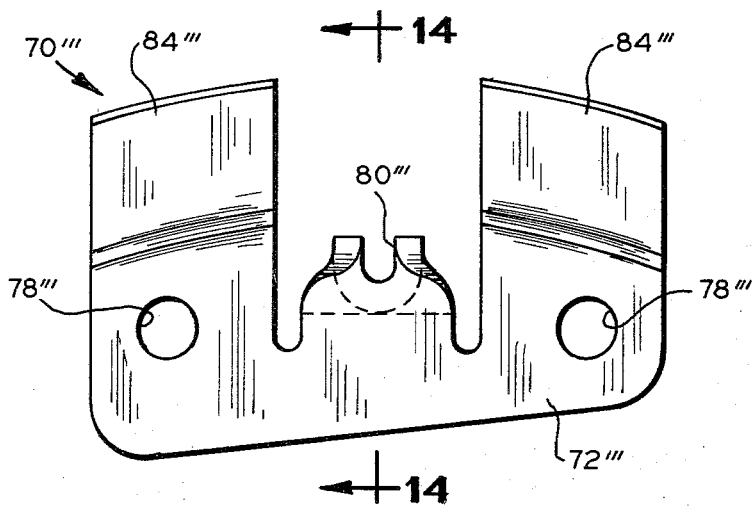
FIG. 13 is a front elevational view of the locking device illustrated in FIG. 12.
Figure 14:
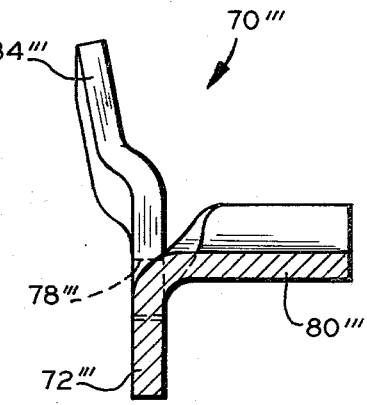
FIG. 14 is an end elevational view of the locking device illustrated in FIGS. 12 and 13.

FIGS. 12, 13, and 14 show still another locking device 70''' which is similar to the locking device 70 illustrated in FIGS. 1 through 5.

The locking device 70''' is typically formed of sheet metal stamped to the desired shape and includes an elongate mounting bracket portion 72''' adapted to span an opening 74 in the back wall of the cover 14. The bracket portion 72''' has a pair of openings 78''' which are adapted to receive threaded fasteners for securing the locking device to the associated cover 14. A detent portion 80''' is struck from an intermediate portion of the blank employed in forming the locking device 70''' and extends inwardly and upwardly from the bracket portion 72'''. The detent portion 80''' is curved upwardly around an axis which extends generally perpendicular to the plane of the bracket portion 72''' and is substantially C-shaped in cross-section forming a pair of spaced apart teeth-like portions. These teeth-like extensions of the detent portion 80''' are adapted to contact suitably formed lug members 82 which extend outwardly from the adjusting ring 18 of the associated clutch.

On opposite sides of the detent portion 80''', there are upwardly and slightly outwardly extending arm portions 84''' which typically provide additional weight to the locking device 70''' to assist in balancing the clutch assembly during operation thereof.

In accordance with the provisions of the Patent Statutes, we have explained the principle and mode of operation of our invention and have illustrated and described what we now consider to represent its best embodiment. However, it must be understood that within the spirit and the scope of the appended claims, the invention may be practiced otherwise than as specifically illustrated and described.

What we claim is:

1. A rotatable clutch assembly including a drive member, support means secured to the drive member, a clutchable driven member, means for clutching the driven member to the drive member, adjusting means supporting the clutching means and connected to the support means for relative rotative movement, and a manually adjustable locking device interconnecting the support means and the adjusting means to militate against any relative rotational movement therebetween, said locking device comprising: a unitary structure including an attaching plate portion defining a first panel, detent means extending inwardly of said plate portion interconnectable with the adjusting means, and arm means extending outwardly from said plate portion in a generally radial direction from the rotational axis of the clutch assembly and defining a second plane displaced from said first plane, said arm means providing additional mass to said locking device to effect balancing of the clutch assembly to militate against vibration of the associated clutch assembly during rotational movement thereof; and means for attaching said plate portion of said unitary structure to the support means.

* * * * *

UNITED STATES PATENT AND TRADEMARK OFFICE
CERTIFICATE OF CORRECTION

PATENT NO. : 4,285,424

DATED : August 25, 1981

INVENTOR(S) : William H. Sink and Richard A. Flotow

It is certified that error appears in the above-identified patent and that said Letters Patent are hereby corrected as shown below:

Column 4, line 61, after "adjusting ring" should be -- 18 --.

Column 4, line 61, "cool" should be -- tool --.

Column 4, line 62, "aperture 71" should be -- aperture 74 --.

Column 5, line 18, "70''" should be -- 70' --.

Signed and Sealed this

Twenty-seventh Day of October 1981

[SEAL]

Attest:

Attesting Officer

GERALD J. MOSSINGHOFF

Commissioner of Patents and Trademarks